April 29, 1947.  A. WARMISHAM ET AL  2,419,803
OPTICAL OBJECTIVE
Filed July 2, 1943
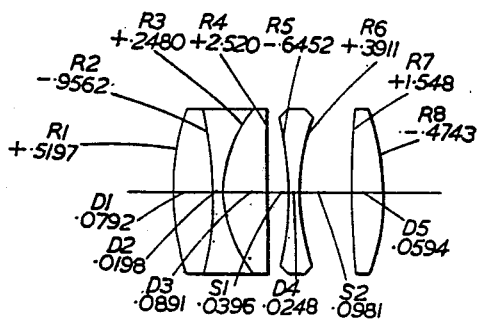
Inventors
A.W. ARMISHAM +
By C.G. WYNNE
Attorneys Patented Apr. 29, 1947

2,419,803

UNITED STATES PATENT OFFICE 2,419,803

OPTICAL OBJECTIVE

Arthur Warmisham and Charles Gorrie Wynne, Leicester, England

Application July 2, 1943, Serial No. 493,274
In Great Britain August 26, 1942

11 Claims. (Cl. 88—57)

This invention relates to optical objectives for photographic or like purposes, comprising two or more divergent elements and two or more convergent elements, and corrected for spherical and chromatic aberrations, coma, astigmatism, curvature of field and distortion, and having small zonal spherical aberration.

It is well-known to provide paraxial chromatic correction in a doublet in respect of two colours, for example red and green, by the use of an appropriate combination of crown and flint glass, but owning to the different relative partial dispersions of the two kinds of glass the correction does not extend throughout the spectrum, and there is a residual colour aberration known as secondary spectrum. Reasonably good correction can be obtained in the well-known triplet objective, which however does not provide correction for field curvature or astigmatism.

The present invention has for its object to provide good correction for secondary spectrum in a photographic or like objective having small zonal spherical aberration without sacrificing correction for astigmatism, field curvature and distortion.

The necessary conditions can be expressed mathematically as follows. If $f_p$ and $m_p$ are respectively the focal length and the magnification of a lens element $p$ having refractive indices $n_C$, $n_D$, $n_e$, $n_F$, $n_g$ respectively for the lines CDeFg Abbé V number $$V_p\left(=\frac{n_D-1}{n_F-n_C}\right)$$

and relative partial dispersion $$\theta_p\left(=\frac{n_g-n_e}{n_F-n_C}\right)$$

then good secondary spectrum correction is obtained if $$\sum \frac{m_p^2}{f_p}\cdot\frac{1}{V_p}=0$$

and $$\sum \frac{m_p^2}{f_p}\cdot\frac{\theta_p}{V_p}=0$$

for all the elements of the objective. It should be made clear that the magnification $m_p$, herein referred to, may be defined as being equal to the ratio $h_p/h_1$, where $h_p$ and $h_1$ are respectively the ordinates of the points of intersection with the lens element $p$ and with the first lens element of a paraxial ray of the wavelength of the D-line through the conjugate points for which the objective is corrected.

In the objective of the above kind forming the subject of the present applicants, concurrent United States patent application Serial Number 493,275, one of the divergent elements is made of a crystalline alum and is cemented between two convergent elements of optical glass. In particular, such application describes and claims the use of a crystalline alum of the double sulphate class and especially potash alum and sodium alum for the said divergent element.

In the objective according to the present invention, one of the divergent elements is made of a crystalline alum of the double selenate class, and is cemented between two convergent elements of optical glass. Such alum may consist of potash selenium alum, for which the formula is $K_2SeO_4.Al_2(SeO_4)_3.24H_2O$.

The two convergent elements cemented to the alum crystal element are preferably made of glasses whose mean refractive indices differ from that of the crystal by more than .1 and less than .25, whilst the Abbé V numbers of the glasses used for all the convergent elements lie between 45 and 62. Dense flint glass is preferably used for one of the divergent elements.

The obective may be arranged in various ways, but conveniently has either its front component or its rear component convergent and of cemented triplet construction including the crystalline alum element as its middle element. Thus the objective may consist of a simple divergent component located between two convergent components, of which one is simple and the other is of cemented triplet construction. In such objective dense flint glass is preferably used for the simple divergent middle component.

The accompanying drawing illustrates one example of objective according to the invention, and numerical data for this example are given in the following table in which R1 R1 . . . represent the radii of curvature of the individual lens surfaces counting from the front (that is the side of the longer conjugate), the positive sign indicating that the surface is convex to the front and the negative sign that it is concave thereto, $D_1$, $D_2$ ... represent the axial thicknesses of the individual lens elements, and $S_1$, $S_2$ represent the axial lengths of the airgaps between the components. The table also gives the mean refractive indices $n_D$ for the D-line, the Abbé V numbers and the relative partial dispersions $\theta$ for the intervals $(e \text{ to } g)/(C \text{ to } F)$ of the glasses or crystals used for the individual elements.

| Equivalent focal length 1.000 | | Relative Aperture F/2.8 | | |
|---|---|---|---|---|
| Radius | Thickness or Air Separation | Refractive Index $n_D$ | Abbé V number | Relative Partial Dispersion |
| $R_1 +.5197$ | | | | |
| | $D_1$ .0792 | 1.613 | 55.7 | 1.010 |
| $R_2 -.9562$ | | | | |
| | $D_2$ .0198 | 1.4801 | 50.5 | 1.00 |
| $R_3 +.2480$ | | | | |
| | $D_3$ .0891 | 1.613 | 53.3 | 1.016 |
| $R_4 +2.520$ | | | | |
| | $S_1$ .0396 | | | |
| $R_5 -.6452$ | | | | |
| | $D_4$ .0248 | 1.621 | 36.1 | 1.052 |
| $R_6 +.3911$ | | | | |
| | $S_2$ .0981 | | | |
| $R_7 +1.548$ | | | | |
| | $D_5$ .0594 | 1.613 | 55.7 | 1.010 |
| $R_8 -.4743$ | | | | |

The objective in this example consists of three components, of which the first is a convergent triplet, the second is divergent and simple, and the third is convergent and simple. The divergent middle element of the front component is made of potash selenium alum and the two convergent elements cemented to it are both made of crown glass. The convergent rear component is also made of crown glass, whilst the divergent middle component is made of dense flint glass.

It will be appreciated that the above arrangement has been described by way of example only and may be modified in various ways within the scope of the invention.

What we claim as our invention and desire to secure by Letters Patent is:

1. An optical objective, corrected for spherical and chromatic aberrations, coma, astigmatism, field curvature and distortion, and comprising three components in axial alignment of which the front and rear components are convergent and the middle component divergent, one of the convergent components being of cemented triplet construction having a focal length between .5 and .7 times the focal length of the complete objective, such triplet component consisting of a double-concave middle element made of crystalline alum of the double selenate class having the formula $R_2SeO_4.Al_2(SeO_4)_3$ with water of crystallization, wherein R represents a monovalent metal or monvalent radical, and two convergent elements between which said middle element is cemented, the algebraic sum of the curvatures of the two cemented surfaces lying between 2 and 4 times the reciprocal of the focal length of the whole triplet component, one cemented surface having a radius of curvature more than twice that of the other cemented surface.

2. An optical objective as claimed in claim 1, in which the two convergent elements cemented to the crystal element are made of glasses whose mean refractive indices differ from that of the crystal by more than .1 and less than .25, the Abbé V numbers of the glasses used for the convergent elements of the objective lying between 45 and 62.

3. An optical objective, corrected for spherical and chromatic aberrations, coma, astigmatism, field curvature and distortion, and comprising three components in axial alignment of which the front and rear components are convergent and the middle component divergent, one of the convergent components being of cemented triplet construction having a focal length between .5 and .7 times the focal length of the complete objective, such triplet component consisting of a double-concave middle element made of crystalline potash selenium alum having the formula $K_2SeO_4.Al_2(SeO_4)_3.24H_2O$ and two convergent elements of optical glass between which said middle element is cemented, the algebraic sum of the curvatures of the two cemented surfaces lying between 2 and 4 times the reciprocal of the focal length of the whole triplet component, one cemented surface having a radius of curvature more than twice that of the other cemented surface.

4. An optical objective as claimed in claim 3, in which the two convergent elements cemented to the crystal element are made of glasses whose mean refractive indices differ from that of the crystal by more than .1 and less than .25, the Abbé V numbers of the glasses used for the convergent elements of the objective lying between 45 and 62.

5. An optical objective, corrected for spherical and chromatic aberrations, coma, astigmatism, field curvature and distortion, and comprising a meniscus-shaped convergent front component of cemented triplet construction having its outer surfaces convex to the front and having a focal length between .5 and .7 times that of the complete objective, a convergent simple rear component, and a divergent simple middle component made of dense flint glass, the triplet front component consisting of a double-concave middle element made of a crystalline alum of the double selenate class having the formula

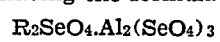

$$R_2SeO_4.Al_2(SeO_4)_3$$

with water of crystallization, wherein R represents a monovalent metal or monovalent radical, and two convergent elements between which said middle element is cemented, the algebraic sum of the curvatures of the two cemented surfaces lying between 2 and 4 times the reciprocal of the focal length of the whole triplet component, one cemented surface having a radius of curvature more than twice that of the other cemented surface, the three convergent elements being made of glasses having Abbé V numbers between 45 and 62 and mean refractive indices between 1.59 and 1.75.

6. An optical objective, corrected for spherical and chromatic aberrations, coma, astigmatism, field curvature and distortion, and comprising a meniscus-shaped convergent front component of cemented triplet construction having its outer surfaces convex to the front and having a focal length between .5 and .7 times that of the complete objective, a convergent simple rear component, and a divergent simple middle component made of dense flint glass, the triplet front component consisting of a double-concave middle element made of crystalline potash selenium alum having the formula $K_2SeO_4.Al_2(SeO_4)_3.24H_2O$ and two convergent elements between which said middle element is cemented, the algebraic sum of the curvatures of the two cemented surfaces lying between 2 and 4 times the reciprocal of the focal length of the whole triplet component, one cemented surface having a radius of curvature more than twice that of the other cemented surface, the three convergent elements being made of glasses having Abbé V numbers between 45 and 62 and mean refractive indices between 1.59 and 1.75.

7. A triplet lens component, comprising a double-concave middle element made of a crystalline alum of the double selenate class having the formula $R_2SeO_4.Al_2(SeO_4)_3$ with water of crystallization, wherein R represents a monovalent metal or monvalent radical, and two convergent elements of optical glass between which said middle element is cemented, the algebraic sum of the curvatures of the two cemented surfaces lying between 2 and 4 times the reciprocal of the focal length of the whole triplet component, one cemented surface having a radius of curvature more than twice that of the other cemented surface.

8. A triplet lens component, comprising a double-concave middle element made of crystalline potash selenium alum having the formula $K_2SeO_4.Al_2(SeO_4)_3.24H_2O$ and two convergent elements of optical glass between which said middle element is cemented, the algebraic sum of the curvatures of the two cemented surfaces lying between 2 and 4 times the reciprocal of the focal length of the whole triplet component, one cemented surface having a radius of curvature more than twice that of the other cemented surface.

9. A triplet lens component, comprising a double-concave middle element made of a crystalline alum of the double selenate class having the formula $R_2SeO_4.Al_2(SeO_4)_3$ with water of crystallization, wherein R represents a monovalent metal or monvalent radical, cemented between two convergent elements made of glasses whose mean refractive indices differ from that of the crystal by more than .1 and less than .25 and whose Abbé V numbers lie between 45 and 62, the algebraic sum of the curvatures of the two cemented surfaces lying between 2 and 4 times the reciprocal of the focal length of the whole triplet component, one cemented surface having a radius of curvature more than twice that of the other cemented surface.

10. A triplet lens component, comprising a double-concave middle element made of crystalline potash selenium alum having the formula $K_2SeO_4.Al_2(SeO_4)_3.24H_2O$ cemented between two convergent elements made of glasses whose mean refractive indices differ from that of the crystal by more than .1 and less than .25 and whose Abbé V numbers lie between 45 and 62, the algebraic sum of the curvatures of the two cemented surfaces lying between 2 and 4 times the reciprocal of the focal length of the whole triplet component, one cemented surface having a radius of curvature more than twice that of the other cemented surface.

11. An optical objective having numerical data substantially as set forth in the following table:

| Equivalent focal length 1.000 | | Relative Aperture F/2.8 | | |
|---|---|---|---|---|
| Radius | Thickness or Air Separation | Refractive Index $n_D$ | Abbé V number | Relative Partial Dispersion |
| $R_1+.5197$ | $D_1$ .0792 | 1.613 | 55.7 | 1.010 |
| $R_2-.9562$ | $D_2$ .0198 | 1.4801 | 50.5 | 1.00 |
| $R_3+.2480$ | $D_3$ .0891 | 1.613 | 53.3 | 1.016 |
| $R_4+2.520$ | $S_1$ .0396 | | | |
| $R_5-.6452$ | $D_4$ .0248 | 1.621 | 36.1 | 1.052 |
| $R_6+.3911$ | $S_2$ .0981 | | | |
| $R_7+1.548$ | $D_5$ .0594 | 1.613 | 55.7 | 1.010 |
| $R_8-.4743$ | | | | |

In which $R_1$, $R_2$ . . . represent the radii of curvature of the individual lens surfaces counting from the front (that is the side of the longer conjugate), the positive sign indicating that the surface is convex to the front and the negative sign that it is concave thereto, $D_1$, $D_2$ . . . represent the axial thicknesses of the individual lens elements, and $S_1$, $S_2$ represent the axial lengths of the air gaps between the components.

ARTHUR WARMISHAM.
CHARLES GORRIE WYNNE.

REFERENCES CITED

The following references are of record in the file of this patent:

UNITED STATES PATENTS

| Number | Name | Date |
|---|---|---|
| 1,588,612 | Richter | June 15, 1926 |
| 1,122,895 | Florian | Dec. 29, 1914 |
| 1,697,670 | Wandersleb et al. | Jan. 1, 1929 |
| 2,085,437 | Michelssen | June 29, 1937 |
| 2,124,301 | Huber | July 19, 1938 |
| 2,252,682 | Aklin | Aug. 19, 1941 |
| 2,289,779 | Herzberger | July 14, 1942 |
| 576,896 | Rudolph | Feb. 9, 1897 |

OTHER REFERENCES

Partington, "Text Book of Inorganic Chemistry," 1937, page 883.